(12) United States Patent
Kong et al.

(10) Patent No.: US 7,714,942 B2
(45) Date of Patent: May 11, 2010

(54) PROJECTOR ASSEMBLY USING A MOBILE TERMINAL

(75) Inventors: Nam-Yong Kong, Seongnam-si (KR); Eui-Yeol Oh, Yongin-si (KR)

(73) Assignee: LG Display Co. Ltd., Seoul (KR)

( * ) Notice: Subject to any disclaimer, the term of this patent is extended or adjusted under 35 U.S.C. 154(b) by 1198 days.

(21) Appl. No.: 11/288,320

(22) Filed: Nov. 29, 2005

(65) Prior Publication Data
US 2006/0121940 A1 Jun. 8, 2006

(30) Foreign Application Priority Data
Dec. 8, 2004 (KR) ...................... 10-2004-0102794

(51) Int. Cl.
*H04N 11/06* (2006.01)
*G08B 1/08* (2006.01)
(52) U.S. Cl. ................................. 348/744; 340/539.13
(58) Field of Classification Search ................ 348/744; 340/539.13; 353/94; 349/114
See application file for complete search history.

(56) References Cited

U.S. PATENT DOCUMENTS

| 5,658,063 | A | * | 8/1997 | Nasserbakht | ................ 353/122 |
| 5,969,698 | A | * | 10/1999 | Richard et al. | ................. 345/7 |
| 6,489,934 | B1 | * | 12/2002 | Klausner | ..................... 345/1.1 |
| 6,776,490 | B2 | * | 8/2004 | Soper et al. | ................... 353/30 |
| 7,057,508 | B2 | * | 6/2006 | Banks et al. | ........... 340/539.13 |
| 7,144,120 | B2 | * | 12/2006 | Soper et al. | ................... 353/94 |
| 2005/0078244 | A1 | * | 4/2005 | Katagami et al. | ........... 349/114 |
| 2007/0195173 | A1 | * | 8/2007 | Nozaki et al. | ............ 348/216.1 |

FOREIGN PATENT DOCUMENTS

KR  10-2003-0005641 A  1/2003

\* cited by examiner

*Primary Examiner*—Paulos M Natnael
(74) *Attorney, Agent, or Firm*—McKenna Long & Aldridge

(57) ABSTRACT

A projector assembly having a mobile terminal, a first light source and a projection lens is provided. The mobile terminal has a display and a body where the display includes a first flat display panel and the body includes an input device. The first light source supplies light to the first flat display panel. The first flat display panel displays images using the light from the first light source. The projection lens projects the images displayed in the first flat display panel.

21 Claims, 10 Drawing Sheets

PROJECTOR ASSEMBLY USING A MOBILE TERMINAL

This application claims the benefit of Korean Patent Application No. 2004-0102794, filed on Dec. 8, 2004, which is hereby incorporated by reference for all purposes as if set forth herein.

BACKGROUND OF THE INVENTION

1. Field of the Invention

The present invention relates to a projector assembly using a mobile terminal, and more particularly, to a projector assembly projecting images displayed on a mobile terminal where the mobile terminal includes a body and a display.

2. Discussion of the Related Art

As the International Mobile Telecommunication 2000 (IMT 2000) service, which is referred to as a dream mobile communication or a terminus of wireless communication, commercializes, the world has become a global community. The IMT 2000 service utilizes a low earth orbit satellite system. Thus, a high speed wireless communication with voice or images may be provided using only a single mobile terminal that is not limited by domestic location or a foreign location, even when users are traveling by ground, sea or air.

IMT 2000 may be classified as a third generation mobile communication, after analog mobile communication and personal communication service (PCS). Since the most important element of an IMT 2000 is a mobile terminal possessed by users, mobile terminals have been researched and developed. As a result, a mobile terminal for an information communication media such as a notebook computer, a laptop computer or a personal digital assistant (PDA) is utilized as an electronic data processing system (EDPS). In addition, a mobile terminal for specialized usage such as a cellular phone and a navigation system is widely used.

Functions of a mobile terminal have improved along with electric communication technology. For example, a cellular phone may have internet access and include a digital camera for taking a picture or moving images and transmitting the image information. In addition, a cellular phone may function as a small data base capable of schedule management or document editing and storage by virtue of increased in memory size. Accordingly, a mobile terminal having a portable size and sufficient user interfaces is required. At the same time, transmission and performance of audio/video (A/V) contents with high quality via a mobile terminal are required. As a result, a mobile terminal is designed to have a larger display area even with a smaller size mobile terminal, thus increasing the development of mobile terminals.

A liquid crystal display (LCD) device is widely used for displaying images in a mobile terminal since an LCD device has a better contrast ratio and color reproducibility in comparison to other flat panel displays (FPD). Currently, the display quality of an LCD device is similar to that of a cathode ray tube (CRT) due to recent technological improvements.

In general, a LCD device uses optical anisotropy and polarization properties of liquid crystal molecules to produce an image. Due to the optical anisotropy of the liquid crystal molecules, refraction of light incident onto the liquid crystal molecules depends upon the alignment direction of the liquid crystal molecules. The liquid crystal molecules have long thin shapes that can be aligned along specific directions. The alignment direction of the liquid crystal molecules can be controlled by applying an electric field. Accordingly, the alignment of the liquid crystal molecules changes in accordance with the direction of the applied electric field. Thus, by properly controlling the electric field applied to a group of liquid crystal molecules within respective pixel regions, a desired image can be produced by appropriately refracting and transmitting the incident light.

There are several types of LCD devices, one of which is commonly referred to as an active matrix LCD (AM-LCD) device. The AM-LCD device includes an array of pixels forming a matrix. Each of the pixels in the AM-LCD device includes a thin film transistor (TFT) and a pixel electrode. The high resolution and superior ability to display moving pictures makes AM-LCD devices an attractive option.

FIG. 1 illustrates a folder type mobile terminal including an LCD device according to the related art. In the folder type mobile terminal of FIG. 1, a larger display area is obtained with a smaller size in comparison with a mobile terminal in which a body having a key pad and a display having an LCD device are arranged in a single plane. The folder type mobile terminal includes a body 2 and a display 6 which are folded or unfolded using a hinge 10. The body 6 includes a control or input device 4 such as a key pad and the display unit 6 includes an LCD device 8. Accordingly, almost all of the area of the display unit 6, which is substantially the same as an area of the body 2, may be used for displaying images when the mobile terminal is unfolded. Thus, when folded, the size of the mobile terminal corresponds to either the body 2 or the display unit 6.

In the mobile terminal, however, images are displayed by a single LCD device 8 having an area smaller than the display unit 6. Accordingly, the ability to display high video contents is limited. In addition, mobile terminals now often combine several functions. For example, a cellular phone may include a digital camera or a navigation system, and movies may be displayed by a cellular phone using a satellite. However, since only a single LCD device having a finite display area is used for displaying images, the full size of the display area is limited to the single LCD device and the displayed images may not be commonly provided for a plurality of users.

SUMMARY OF THE INVENTION

Accordingly, the present invention is directed to a projector assembly using a mobile terminal that substantially obviates one or more of the problems due to limitations and disadvantages of the related art.

An advantage of the present invention is to provide a projector assembly using a mobile terminal that displays large sized images for a plurality of users.

Another advantage of the present invention is to provide a projector assembly where images of a mobile terminal are projected.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a projector assembly having a mobile terminal, a first light source and a projection lens is disclosed. The mobile terminal includes a display and a body where the display has a first flat display panel and the body has an input device. The first light source supplies light to the first flat display panel such that the first flat display panel displays images using the light. The projection lens projects images which are displayed in the first flat display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

A mobile terminal according to the present invention can be embodied as one of a cellular phone, a notebook computer, a personal digital assistant (PDA), a navigation device, a digital camera, a digital camcorder, and a small-sized television application for vehicles or the like. Other applications of the mobile terminal according to the present invention are possible and contemplated in the present invention.

Figure 1:
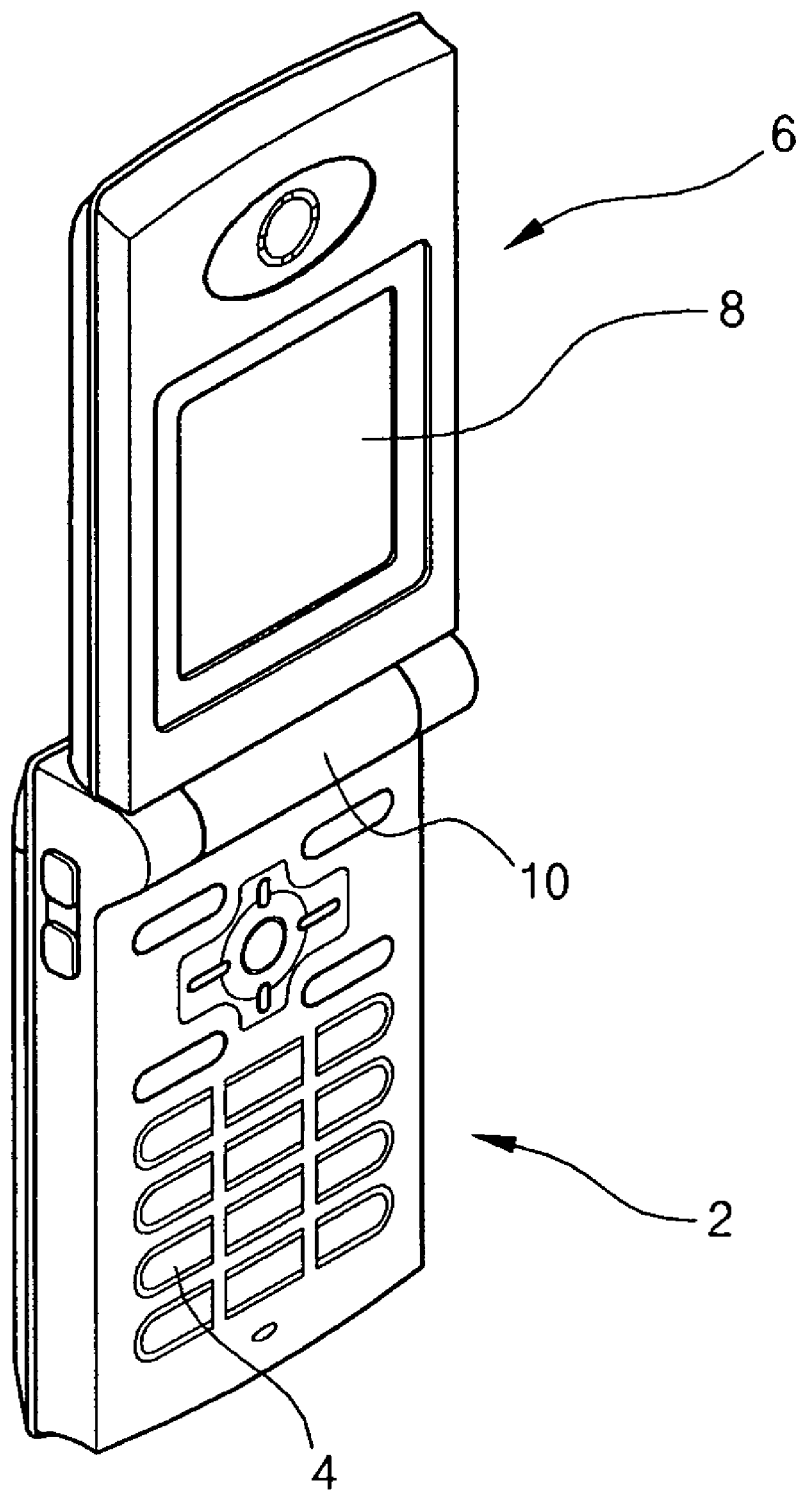
FIG. 1 illustrates a folder type mobile terminal including an LCD device according to the related art.
Figure 2:
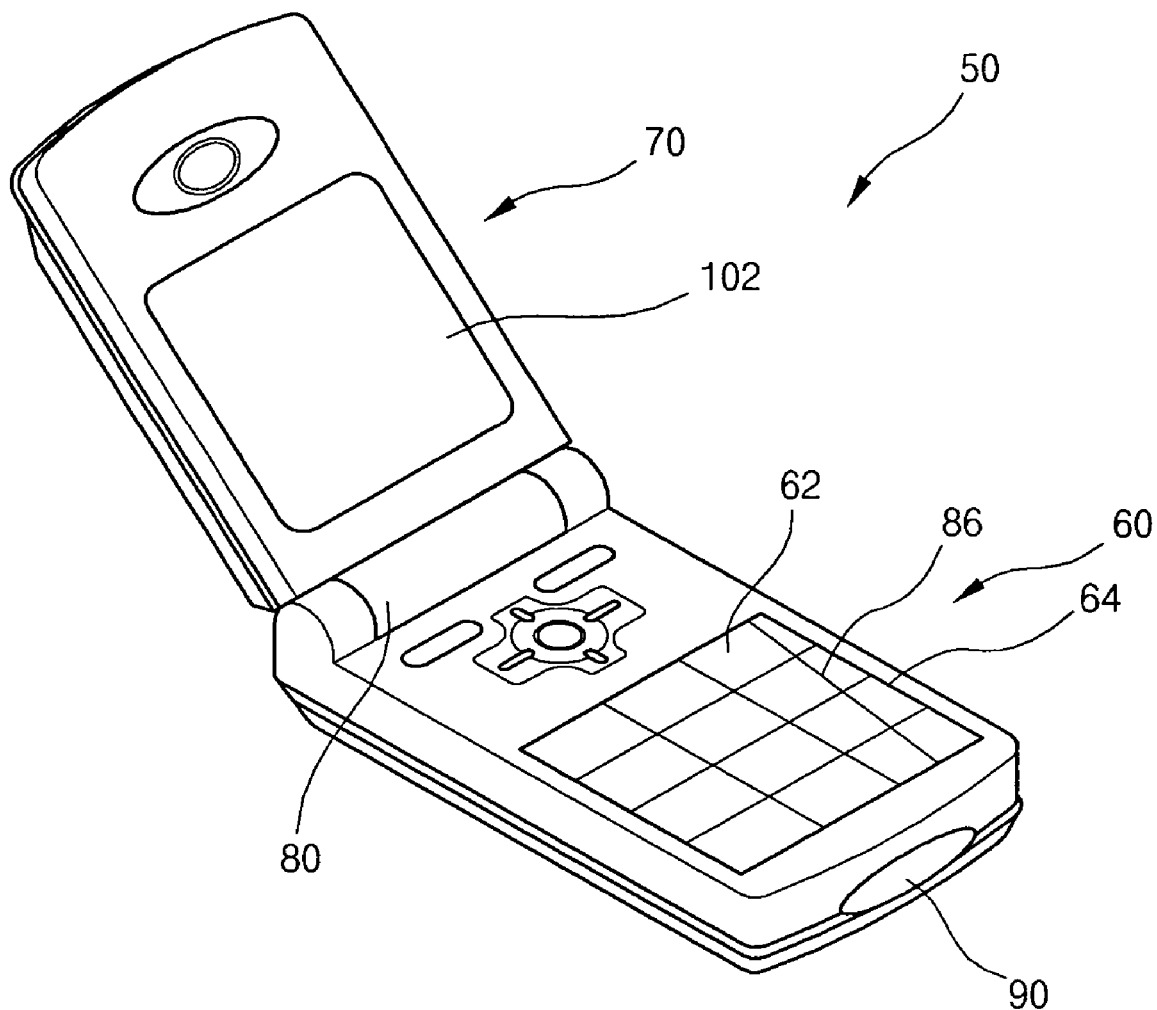
FIG. 2 is a perspective view showing a projector assembly according to a first embodiment of the present invention.

FIG. 2 is a schematic perspective view showing a projector assembly according to a first embodiment of the present invention. In this embodiment, a cellular phone is shown as a mobile terminal.

In FIG. 2, a projector assembly 50 includes a body 60 having an input device 62 and a display unit 70 having a first flat display panel 102 such as a liquid crystal display panel. The projector assembly 50 may be a folding type assembly where the body 60 and the display unit 70 are connected to each other using a hinge 80. The first flat display panel 102 displays images for a user of a mobile terminal, i.e., the projector assembly 50. In addition, the images are used as original images for multiple users of the projector assembly 50, where the original images are magnified and projected. Accordingly, the projector assembly 50 further includes a projection lens 90 for magnifying and projecting the images displayed in the first flat display panel 102. A liquid crystal panel will be illustrated as the first flat display panel 102 hereinafter.

Figure 3:
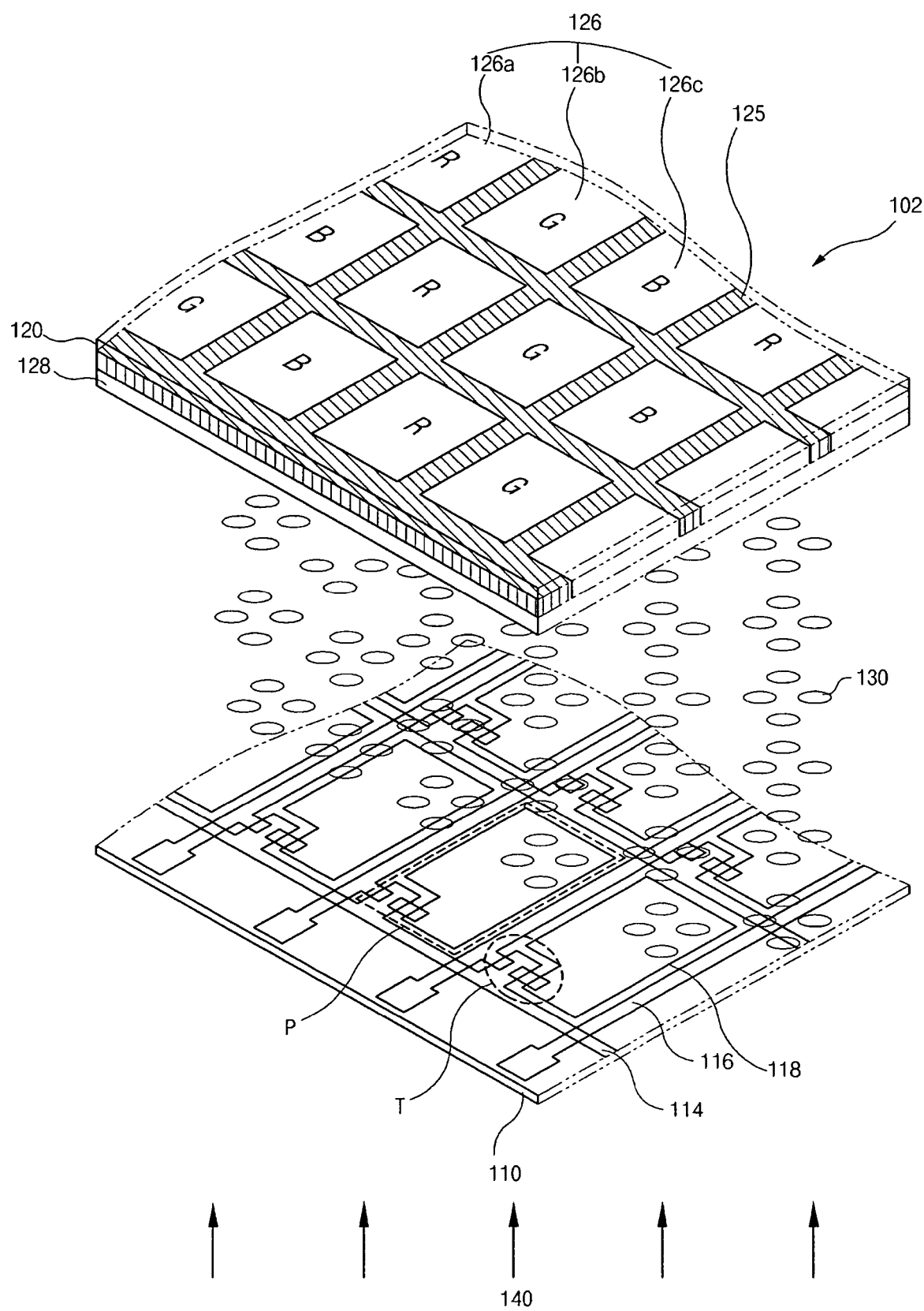
FIG. 3 is an exploded perspective view showing a liquid crystal display device of a projector assembly according to a first embodiment of the present invention.

FIG. 3 is an exploded perspective view showing a liquid crystal display device of a projector assembly according to a first embodiment of the present invention. It should be noted that other FPD devices may be substituted for the liquid crystal display which is described herein.

In FIG. 3, an LCD device according to the present invention includes a first liquid crystal panel 102 including first and second substrates 110 and 120. The first and second substrates 110 and 120 are spaced apart from each other, and a first liquid crystal layer 130 is interposed between the first and second substrates 110 and 120. The first substrate 110 is referred to as a lower substrate or an array substrate, and the second substrate 120 is referred to as an upper substrate or a color filter substrate.

A gate line 114 and a data line 116 are formed on an inner surface of the first substrate 110. The gate line 114 and the data line 116 cross each other to define a pixel region "P," and a thin film transistor (TFT) "T" is connected to the gate line 114 and the data line 116. A first pixel electrode 118 of a transparent conductive material connected to the TFT "T" is disposed in each pixel region "P." A black matrix 125 and a color filter layer 126 are formed on an inner surface of the second substrate 120. The black matrix 125 covers the gate line 114, the data line 116 and the TFT "T" of the first substrate 110, which correspond to portions not driving the first liquid crystal layer 130, and has openings in the matrix exposing the pixel electrode 118. The color filter layer 126 includes red, green and blue sub-color filters 126a, 126b and 126c sequentially disposed in the openings. A first common electrode 128 of a transparent conductive material is formed on the black matrix 125 and the color filter layer 126.

Even though not shown in FIG. 3, first and second polarizing films may be formed on outer surfaces of the first and second substrates 110 and 120, respectively. Moreover, alignment layers may be formed on the pixel electrode 118 and the common electrode 128, respectively.

Since the first liquid crystal panel 102 does not have an emissive element, a first light source 140 is disposed under the first substrate 110 to provide light to the liquid crystal panel 102. An alignment direction of liquid crystal molecules and a transmittance of the first liquid crystal layer 130 are changed due to a voltage difference between the pixel electrode 118 and the common electrode 128. When the alignment direction and transmittance are changed, the first liquid crystal panel 102 displays various images by the transmittance difference of light from the first light source 140 and a combination of red, green and blue sub-color filters 126a, 126b and 126c. Thus, the first liquid crystal panel 102 functions as a transmissive display device using an external light.

Figure 4A:
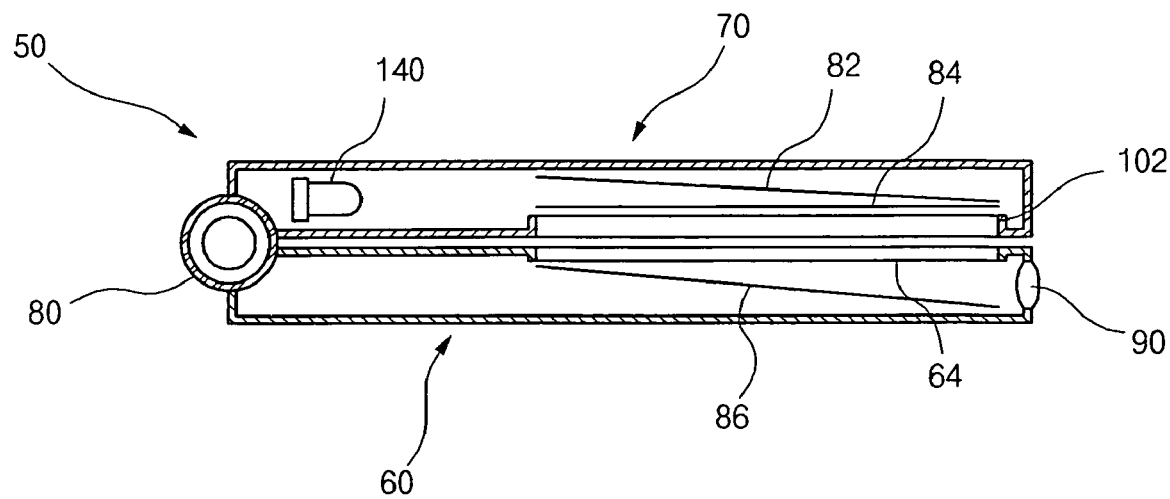
FIGS. 4A and 4B are a cross-sectional view and a perspective view, respectively, showing a projector assembly according to a first embodiment of the present invention.
Figure 4B:
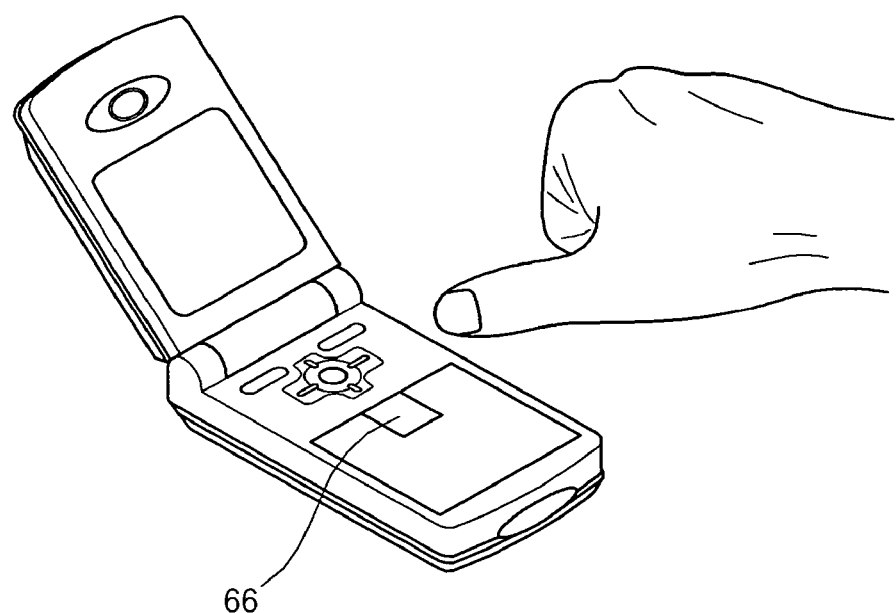

FIGS. 4A and 4B are a cross-sectional view and a perspective view, respectively, showing a projector assembly according to a first embodiment of the present invention where a body and a display unit are folded.

In FIG. 4A, the body 60 faces a display unit 70. The first liquid crystal panel 102 is formed in an inner surface of the display unit 70 and the first light source 140 is formed in the display unit 70. In addition, a first reflecting sheet 82 and a first diffusing sheet 84 are formed in the display unit 70 such that the first reflecting sheet 82 and the first diffusing sheet 84 are disposed over the first liquid crystal panel 102. The first diffusing sheet may be a prism sheet. A window 64 is formed in an inner surface of the body 60 to correspond to the first liquid crystal panel 102. A second reflecting sheet 86 is formed in the body 60 under the window 64 and the projection lens 90 is formed in a side surface of the body 60.

The projector assembly 50 functions as a mobile terminal and a projector. The projector assembly 50 displays images through the first liquid crystal panel 102 in a normal mode and a projection mode. In the normal mode, the images are directly shown to a user of the projector assembly. In the projection mode, the images are magnified and projected to multiple users. The first light source 140 supplies light having a first brightness or a second brightness which is greater than the first brightness. In the normal mode, the first light source 140 is used as a backlight unit for the first liquid crystal panel 102 and the light having the first brightness is supplied to the first liquid crystal panel 102. In the projection mode, the first light source 140 is used as a light source for a projector and the light of the second brightness is supplied to the liquid crystal panel 102. For example, a light emitting diode (LED) may be used as the first light source 140 since the brightness of the LED is adjustable and the LED has excellent maximum brightness characteristics.

The light emitted from the first light source 140 reflects on the first reflecting sheet 82 having a white color or a silver color. The emitted light is then supplied to the first liquid crystal panel 102 through the first diffusing sheet 84. In an embodiment where the first diffusing sheet is a prism sheet, the first diffusing sheet improves light uniformity. A plurality of sheets may also be used as the first diffusing sheet 84. Thus, the first liquid crystal panel 102 displays images using the light supplied from the first light source 140 through the first reflecting sheet 82 and the first diffusing sheet 84.

In the normal mode, the images displayed by the first liquid crystal panel 102 are directly shown to a user, where the body 60 and the display unit 70 are unfolded. In addition, the images displayed by the first liquid crystal panel 102 are used as original images for a projector in the projection mode, where the body 60 and the display unit 70 are folded. In the projection mode, the images displayed in the first liquid crystal panel 102 are transmitted to the second reflecting sheet 86 through the window 64. The images reflect on the second reflecting sheet 86 and then transmit to the projection lens 90. The images are magnified and projected through the projection lens 90 so that multiple users can see the images. The liquid crystal panel 102 may be centrally disposed on an inner surface of the display unit 70, and the window 64 corresponding to the liquid crystal panel 102 may be centrally disposed on an inner surface of the body 60. The projection lens 90 may be disposed on a side surface of the body 60 adjacent to the window 64.

Accordingly, the projector assembly 50 is used as a projector in a projection mode where the body 60 and the display unit 70 are folded and the first light source 140 emits light having the second brightness. Furthermore, in the normal mode, the projector assembly 50 may be used as a mobile terminal such as a cellular phone where the body 60 and the display unit 70 are unfolded and the first light source 140 emits light having the first brightness which is less than the second brightness. In accordance with another embodiment of the present invention, the shapes and positions of the first reflecting sheet 82, the first diffusing sheet 84 and the second reflecting sheet 86 may vary when the light from the first light source 140 is supplied to the projection lens 90 through the first liquid crystal panel 102 and the window 64.

Moreover, an operation mode such as the normal mode and the projection mode may be selected using the input device 62 or an additional control (not shown). For example, after the projection mode is selected and the images are displayed in the first liquid crystal panel 102, the body 60 and the display unit 70 are folded and the images are magnified and projected through the projection lens 90. When the normal mode is selected, the projector assembly 50 is used as a mobile terminal such as a cellular phone with the body 60 and the display unit 70 unfolded. Since an effective area of the body 60 decreases due to the window 64, the input device 62 may be formed in the window 64. For example, a touch pad as the input device 62 may be formed in the window 64. Further, as shown in FIG. 4B, a finger print recognizer 66 may be formed in the window 64 for security. Accordingly, various devices may be formed in the window 64 as the images pass through the window 64 where the devices are not damaged when the image passes through the window 64.

Figure 5:
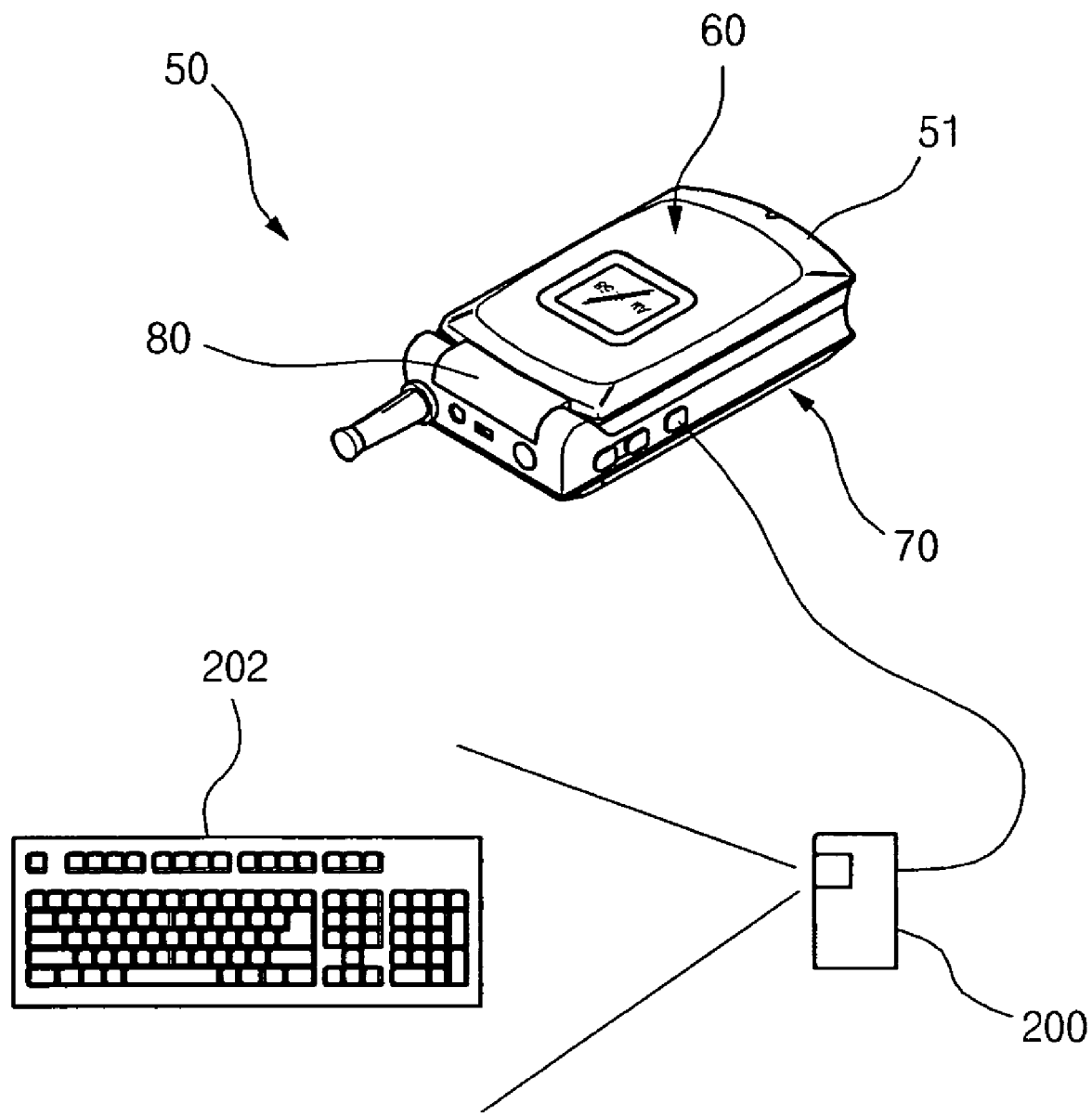
FIG. 5 is a view showing the application of a projector assembly according to a first embodiment of the present invention.

FIG. 5 is a view showing application of a projector assembly according to a first embodiment of the present invention.

In FIG. 5, the projector assembly 50 is connected to a virtual input unit 200 such as a virtual keyboard. The virtual input unit 200 projects a keyboard image 202. When a user types on the keyboard image 202, the virtual input unit 200 senses positions of fingers of the user and translates the position information into input information. Accordingly, the virtual input unit 200 includes a projection means and a sensing means. The body 60 includes a logic operation circuit which includes an algorithm for operating the virtual input unit 200. As a result, information input using the virtual input unit 200 is displayed in the first liquid crystal panel 102. The input information may be projected in the projection mode, and the projector assembly 50 may be used as a document editor.

Figure 6:
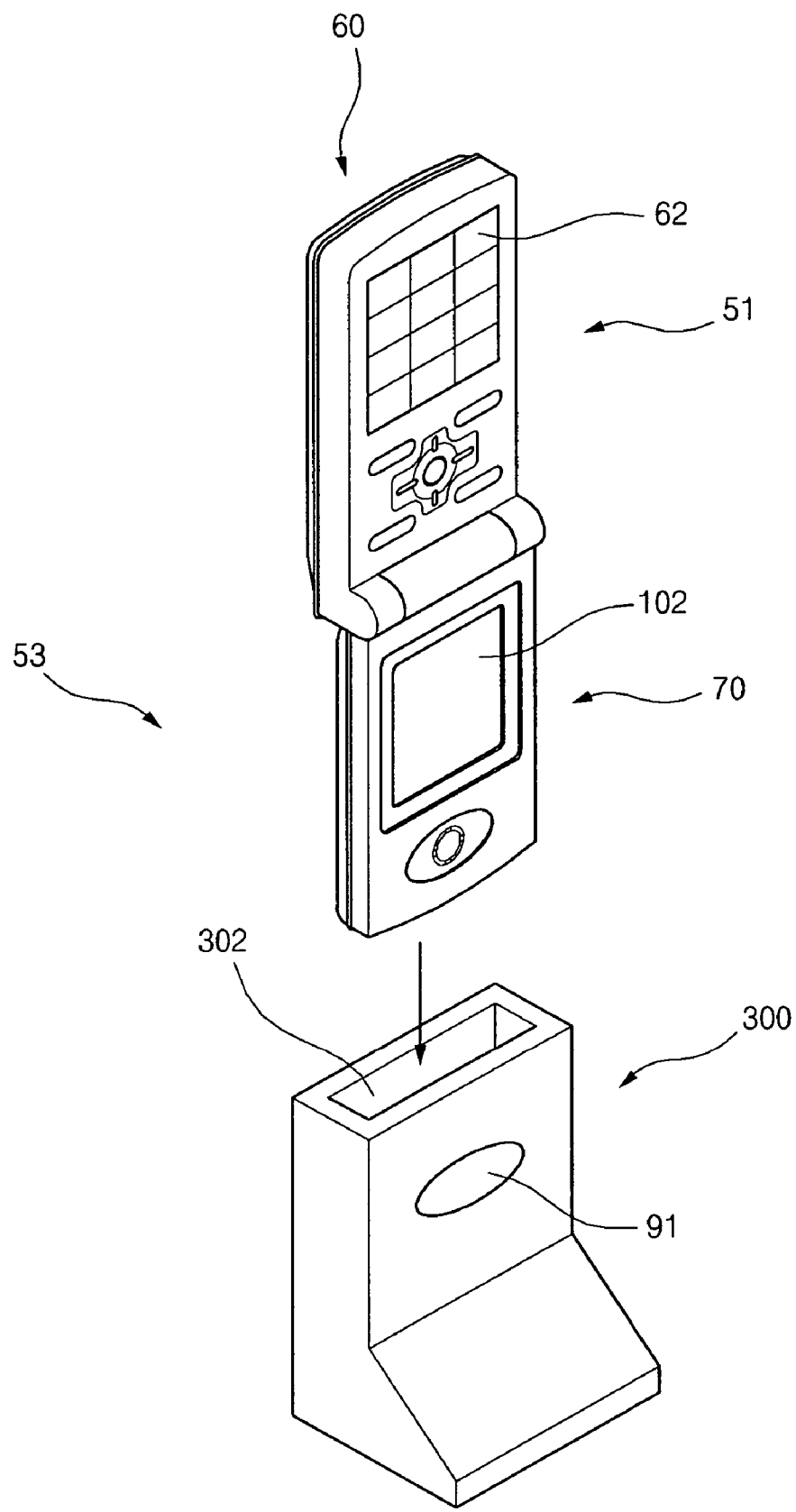
FIG. 6 is an exploded perspective view showing a projector assembly according to a second embodiment of the present invention.

FIG. 6 is an exploded perspective view showing a projector assembly 53 according to a second embodiment of the present invention.

In FIG. 6, a projector assembly includes a mobile terminal 51 and a cradle terminal 300. The mobile terminal 51 includes the body 60 having the input device 62 such as a keypad and the display unit 70 having a flat display panel such as a first liquid crystal panel 102. The cradle terminal 300 includes a receiver 302 configured such that the receiving portion 302 receives the display unit 70 of the mobile terminal 51. In addition, a projection lens 91 is formed through a sidewall of the cradle terminal 300 such that the display 70 aligns with the projection lens 91 when the display 70 is placed in the receiver 302.

In a projection mode, the mobile terminal 51 is put into the cradle terminal 300. A first light source which assists with projecting images may be formed in the display unit 70 of the mobile terminal 51 or may be formed in the cradle terminal 300. When the first light source is formed in the display unit 70, light emitted from the first light source is transmitted to the first liquid crystal panel 102 and images are displayed on the first liquid crystal panel 102. The images are magnified and projected through the projection lens 90. In an embodiment where the first light source is formed in the cradle terminal 300, a rear surface of the display unit 70 has a transparent portion which allows transmission of light from the first light source there through to the first liquid crystal panel 102. The structure of the mobile terminal 51 for the projector where the first light source is formed in the cradle terminal will be illustrated with reference to FIG. 7.

Figure 7:
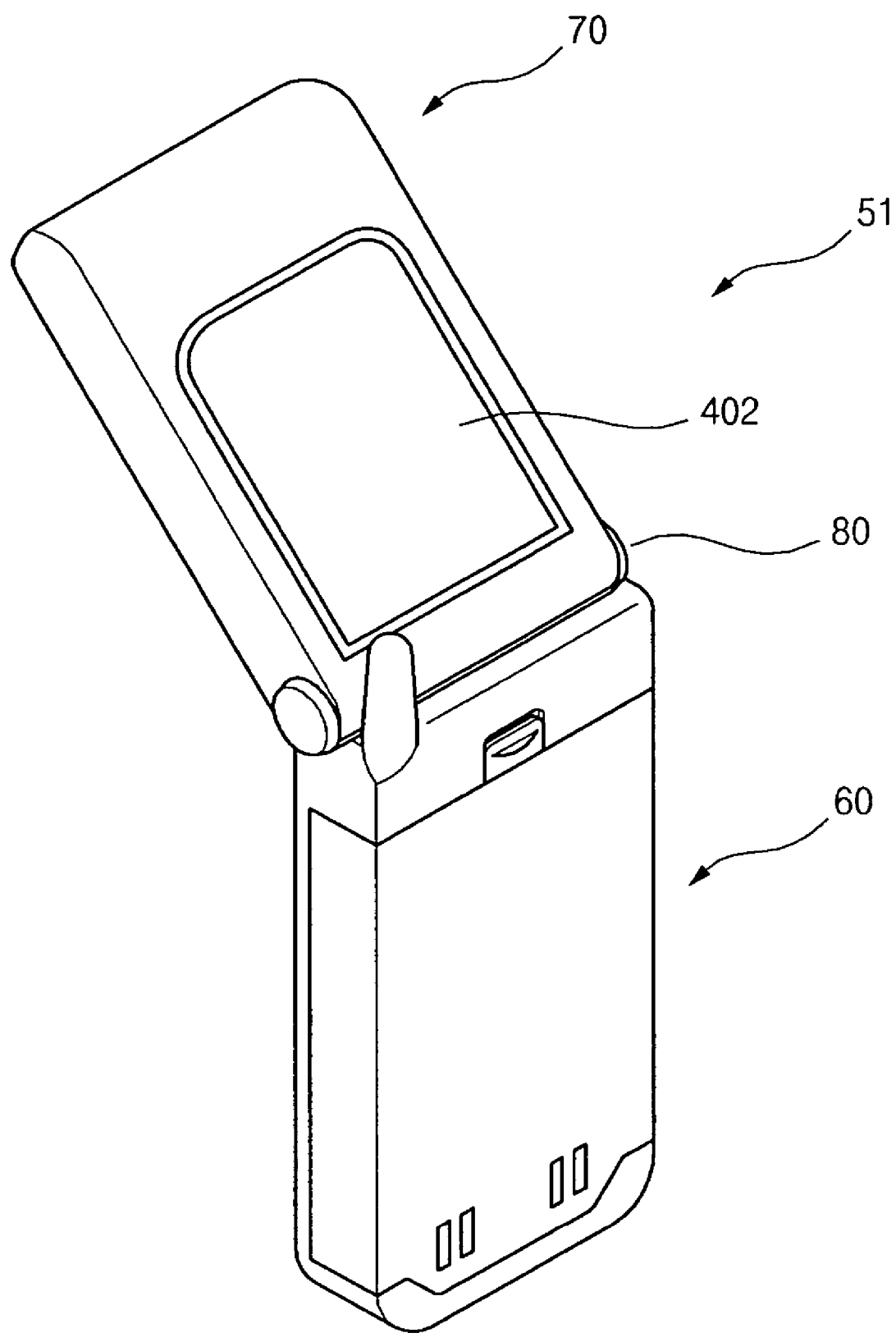
FIG. 7 is a perspective view showing a rear surface of a mobile terminal for a projector assembly according to a second embodiment of the present invention.

FIG. 7 is a perspective view showing a rear surface of a mobile terminal for a projector assembly according to a second embodiment of the present invention. The mobile terminal 51 of FIG. 7 may be applied to a projector assembly where a first light source is formed in a cradle terminal.

In FIG. 7, the mobile terminal 51 includes the body 60 having the input device 62 and a display unit 70. The body 60 and the display unit 70 are foldable and unfoldable from each other via the hinge 80. The display unit 70 includes first and second liquid crystal panels 102 and 402. In addition, the projector assembly includes a second flat display panel or a second liquid crystal panel 402. The first liquid crystal panel 102 is formed on a first surface of the display unit 70 and the second liquid crystal panel 402 is formed on a second surface opposite to the first surface of the display unit 70. The second liquid crystal panel 402 functions as a shutter which transmits or blocks light. In a projection mode, the mobile terminal 51 is put into the cradle terminal 300 (of FIG. 6) having a first light source. When the second liquid crystal panel 402 transmits light, the light from the first light source in the cradle terminal 300 (of FIG. 6) passes through the second liquid crystal panel 402 and is supplied to the first liquid crystal panel 102. When the second liquid crystal panel 402 blocks light, the light from the first light source in the cradle terminal 300 (of FIG. 6) does not reach the first liquid crystal panel 102.

Figure 8:
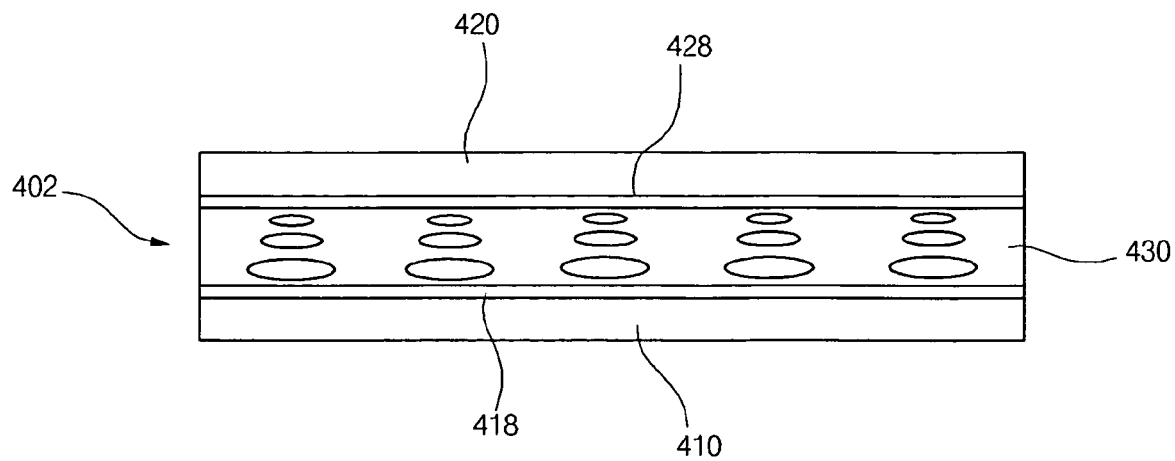
FIG. 8 is a cross-sectional view showing a second liquid crystal panel for a mobile terminal of a projector assembly according to a second embodiment of the present invention.

FIG. 8 is a cross-sectional view showing a second liquid crystal panel for a mobile terminal of a projector assembly according to a second embodiment of the present invention. A second liquid crystal panel may have substantially the same structure (i.e., active matrix type) as a first liquid crystal panel. However, since the second liquid crystal panel may transmit or block light as a whole panel, the active matrix type may not be used.

In FIG. 8, the second liquid crystal panel 402 includes third and fourth substrates 410 and 420 facing each other, and a second liquid crystal layer 430 interposed between the third and fourth substrates 410 and 420. A second pixel electrode 418 and a second common electrode 428 are formed on the third and fourth substrates 410 and 420, respectively. The second liquid crystal layer 430 is driven by voltages applied to the second pixel electrode 418 and the second common electrode 428. In a normally white mode, for example, the second liquid crystal layer 430 transmits light when voltages are not applied to the second pixel electrode 418 and the second common electrode 428. In addition, the second liquid crystal layer 430 blocks light when voltages are applied to the second pixel electrode 418 and the second common electrode 428. Twisted nematic (TN) liquid crystal materials may be used for the second liquid crystal layer 430. Alternatively, a shutting means such as a manual shutter may be formed in an open portion in the rear surface of the display unit 70 in place of the second liquid crystal panel 402.

Figure 9A:
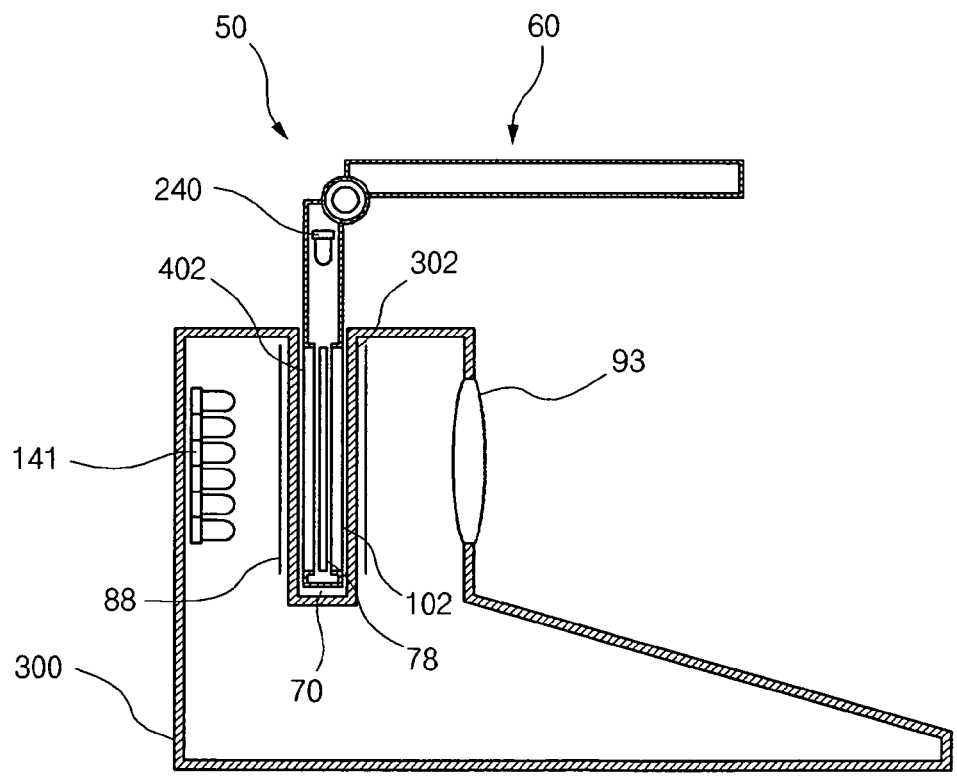
FIGS. 9A and 9B are cross-sectional views showing projector assemblies according to second and third embodiments of the present invention, respectively.
Figure 9B:
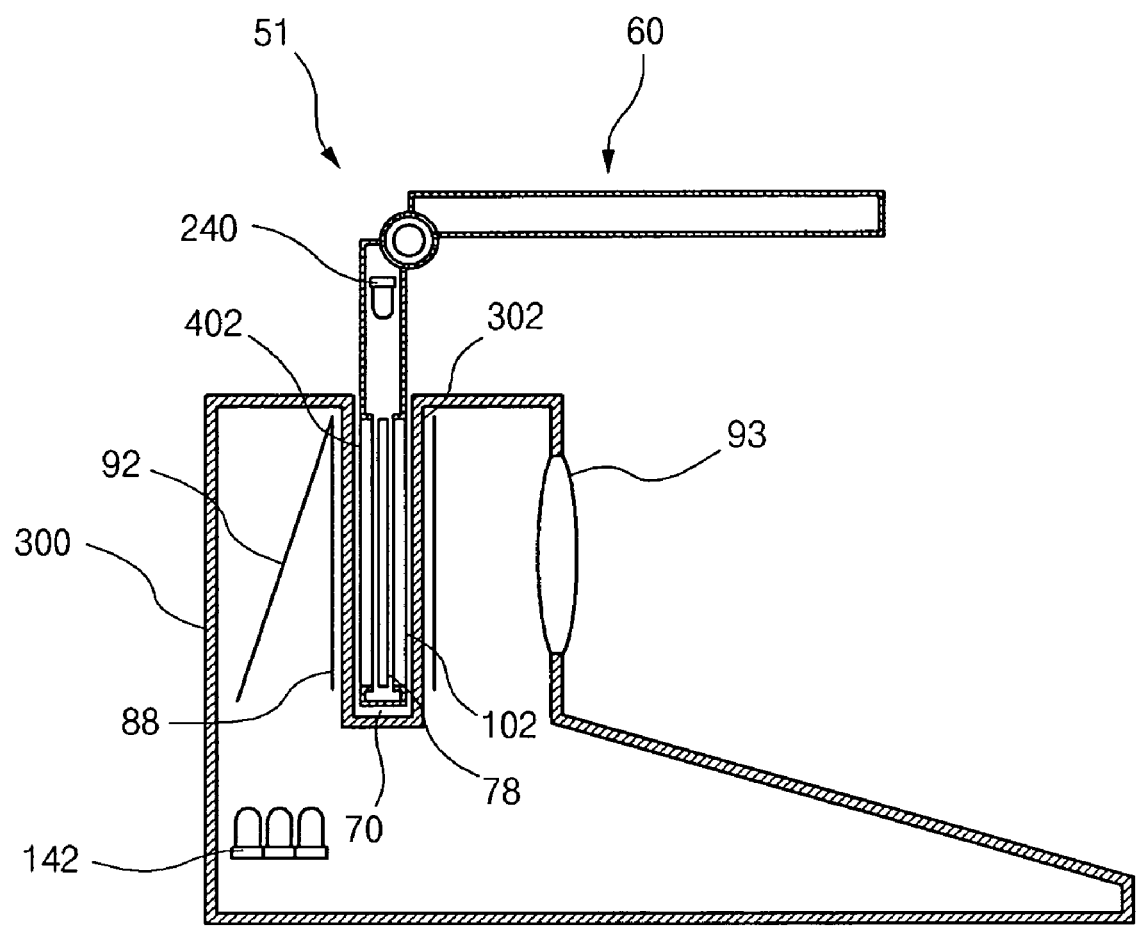

FIGS. 9A and 9B are schematic cross-sectional views showing projector assemblies according to second and third embodiments of the present invention, respectively.

In FIG. 9A, the display unit 70 of the mobile terminal 51 is placed into the receiver 302 of the cradle terminal 300. A first light source 141 is formed on an inner sidewall of the cradle terminal 300. The first light source 141 faces a rear surface of the display unit 70 having first and second liquid crystal panels 102 and 402, and a projection lens 93 is formed in the sidewall of the cradle terminal 300 opposite the first light source 140. The second liquid crystal panel 402 is controlled to transmit light. In this embodiment, the first light source 141, the second liquid crystal panel 402, the first liquid crystal panel 102, and the projection lens are substantially aligned. Accordingly, light emitted from the first light source 141 is transmitted to the projection lens 93 through the second and first liquid crystal panels 402 and 102 such that images of the first liquid crystal panel 102 can be magnified and projected. In addition, a second diffusing sheet 88 is interposed between the first light source 141 and the second liquid crystal panel 402 to improve uniformity of the light from the first light source 141. In another embodiment, the second diffusing sheet 88 may be disposed between the second and first liquid crystal panels 402 and 102.

In FIG. 9B, the display unit 70 of the mobile terminal 51 is placed into the receiver 302 of the cradle terminal 300. A first light source 142 is formed on an inner bottom of the cradle terminal 300 and a third reflecting sheet 92 is formed over the first light source 141. The third reflecting sheet 92 faces a rear surface of the display unit 70 having first and second liquid crystal panels 102 and 402. As a result, light emitted from the first light source 140 reflects on the third reflecting sheet 92 and is transmitted to the second liquid crystal panel 402. In accordance with other embodiments of the present invention, the third reflecting sheet 92 may have various configurations and various positions vary where the additional configurations and positions allow for the supplying of light from the first light source 140 to the second liquid crystal panel without light loss. The projection lens 93 is formed in the sidewall of the cradle terminal 300. The second liquid crystal panel 402 is controlled to transmit light. Accordingly, light emitted from the first light source 142 is transmitted to the projection lens 90 through the third reflecting sheet 92, the second liquid crystal panel 402 and the first liquid crystal panel 102 so that images of the first liquid crystal panel 102 can be magnified and projected. The second diffusing sheet 88 is further interposed between the first light source 142 and the second liquid crystal panel 402 to improve uniformity of the light from the first light source 142. In another embodiment, the second diffusing sheet 88 may be disposed between the second and first liquid crystal panels 402 and 102. When the first liquid crystal panel 102 and the projection lens are not substantially aligned, an additional reflecting sheet may be used to change a light path.

In FIGS. 9A and 9B, the mobile terminal 51 may include a second light source 240 which supplies light to the first liquid crystal panel 102 when the mobile terminal 51 is removed from the cradle terminal 300. Accordingly, the mobile terminal 51 such as a cellular phone can display images in a normal mode. The second light source 240 may be disposed in the display unit 70. In addition, a light guide plate 78 may be formed between the first and second liquid crystal panels 102 and 402 to change a light path of light which is laterally input. Although not shown in FIGS. 9A and 9B, an additional diffusing sheet may be disposed between the light guide plate 78 and the first liquid crystal panel 102.

After the display unit 70 of the mobile terminal 51 is placed into the receiver 302 of the cradle terminal 300, the second liquid crystal panel 402 is adjusted to transmit light by a control or an additional button, and light from the first light source 142 in the cradle terminal 300 is transmitted to the projection lens 93 through the second and first liquid crystal panels 402 and 102. As a result, images from the first liquid crystal panel 102 are magnified and projected in a projection mode. In a normal mode, the mobile terminal 51 is not placed in the cradle terminal 300 and the second liquid crystal panel 402 does transmit light. The second light source 240 in the display unit 70 supplies light to the first liquid crystal panel 102. As a result, images of the first liquid crystal panel 102 are directly displayed in the normal mode. In one embodiment, the mobile terminal 51 may be used as a cellular phone.

Since the first light source 142 in the cradle terminal 300 is used in the projection mode and the second light source 240 in the display unit 70 is used in the normal mode, the first light source 142 may emit light of a higher brightness and the second light source 240 may emit light of a lower brightness. In addition, since the first light source 142 used in the projection mode is disposed in the cradle terminal 300, the projector assembly of the second and third embodiments minimizes costs associated with installation.

Figure 10:
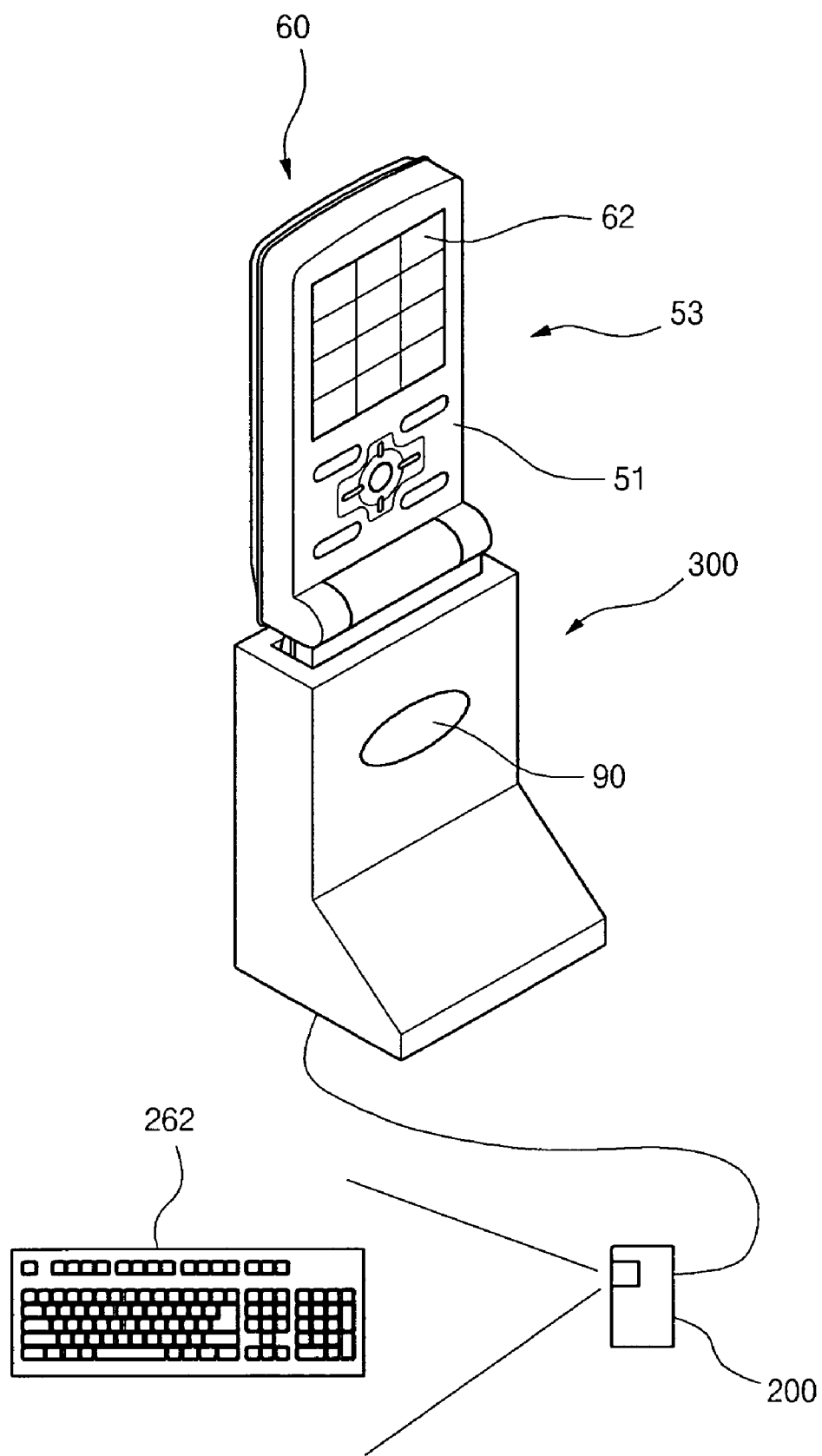
FIG. 10 is a view showing the application of a projector assembly according to second and third embodiments of the present invention.

FIG. 10 is a view showing the application of a projector assembly 53 according to second and third embodiments of the present invention.

In FIG. 10, a projector assembly includes the mobile terminal 51, the cradle terminal 300 and the virtual input unit 200. The mobile terminal 51 is placed into the cradle terminal 300 which is connected to the virtual input unit 200 such as a virtual keyboard. The virtual input unit 200 projects a keyboard image 262. When a user types on the keyboard image 262, the virtual input unit 200 senses positions of fingers of the user and translates the position information into input information. Accordingly, the virtual input unit 200 includes a projection means and a sensing means. A logic operation circuit which includes an algorithm for operating the virtual input unit 200 may be disposed in the body 60 or in the cradle terminal 300. As a result, the information input using the virtual input unit 200 is displayed in the first liquid crystal panel 102. The input information may be projected in the projection mode, and the projector assembly 50 may be used as a document editor.

The cradle terminal 300 may function as a charger for a cellular phone and charging terminals may be exposed at the bottom of the receiver 302 (of FIGS. 9A and 9B). Contact terminals of the mobile terminal 51 may contact the charging terminals to charge the mobile terminal 51.

Even though a cellular phone and a liquid crystal panel are illustrated, other mobile terminals and other flat display panels may be applied to a projector assembly according to the present invention. For example, any mobile terminal including a body having an input device and a display unit having a flat display panel, where the body and the display unit are combined using a hinge, may be applied to a projector assembly according to the present invention. In addition, any mobile terminal including a display unit that can be placed into a cradle terminal which has first and second flat display panels may be applied to a projector assembly according to the present invention.

Consequently, the present invention provides a projector assembly which is able to magnify and project images displayed in a portable device. Accordingly, utilization of a mobile terminal is enlarged and disadvantages of a mobile terminal due to a small display size are improved. For example, movies may be displayed through the projector assembly to multiple users. Documents saved in a mobile terminal may be suggested to multiple users and may be edited using an input means. As a result, a small volume for portability and a large display size for multiple users are simultaneously obtained.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A projector assembly, comprising:
    a mobile terminal including a display and a body, the display having a first flat display panel and the body having an input device;
    a first light source supplying light to the first flat display panel, the first flat display panel displaying images using the light from the first light source, wherein the first light source is formed in the display;
    a projection lens projecting the images displayed in the first flat display panel;
    a first reflecting sheet in the display, the first reflecting sheet configured to reflect light emitted from the first light source toward the flat display panel; and
    at least one diffusing sheet between the first light source and the first flat display panel,
    wherein the projection lens is formed in the body and the body includes a window where the window faces the first flat display panel when the body and the display are folded, and
    wherein the images are transmitted through the window.

2. The projector assembly according to claim 1, wherein the first flat display panel includes a first liquid crystal panel.

3. The projector assembly according to claim 2, wherein the first liquid crystal panel comprises:
    a first substrate, the first substrate including:
    a gate line;
    a data line crossing the gate line thereby defining a pixel region;
    a thin film transistor coupled with both the gate line and the data line; and
    a first pixel electrode disposed in the pixel region;
    a second substrate facing the first substrate where a first liquid crystal layer is disposed between the first substrate and the second substrate, the second substrate including:
    a black matrix having open portions exposing the first pixel electrode;
    a color filter layer having red, green and blue sub-color filters which correspond to the open portions; and
    a first common electrode disposed on the color filter layer.

4. The projector assembly according to claim 1, wherein the projector assembly operates in a normal mode where the images are displayed on the first flat display panel, wherein the first light source emits a first light having a first brightness in the normal mode.

5. The projector assembly according to claim 4, wherein the body and the display are connected to each other via a hinge such that the display is rotatable relative to the body where the mobile terminal is foldable.

6. The projector assembly according to claim 4, wherein the projector assembly operates in a projection mode such that the images are projected through the projection lens, wherein the first light source emits a second light having a second brightness in the projection mode where the second brightness is greater than the first brightness in the projection mode.

7. The projector assembly according to claim 1, further comprising a second reflecting sheet in the body, wherein the projection lens is formed in a sidewall of the body and the second reflecting sheet reflects the images transmitted through the window toward the projection lens.

8. The projector assembly according to claim 1, further comprising a touch pad and a finger print recognizer on the window.

9. The projector assembly according to claim 1, further comprising a virtual input unit coupled with the mobile terminal.

10. The projector assembly according to claim 1, wherein the mobile terminal includes one of a cellular phone, a notebook computer, a personal digital assistant (PDA), and a navigation system.

11. A projector assembly, comprising:
- a mobile terminal including a display and a body, the display having a first flat display panel and the body having an input device;
- a first light source supplying light to the first flat display panel, the first flat display panel displaying images using the light from the first light source;
- a projection lens projecting the images displayed in the first flat display panel; and
- a cradle terminal having a receiver and a sidewall, wherein the projection lens is formed in a sidewall of the cradle terminal, the display being placed into the receiver such that the display aligns with the projection lens.

12. The projector assembly according to claim 11, wherein the first light source is disposed the cradle terminal and the display includes a second flat display panel opposite the first flat display panel.

13. The projector assembly according to claim 12, wherein the second flat display panel adjusts a transmission of the light from the first light source to the first flat display panel.

14. The projector assembly according to claim 12, further comprising at least one diffusing sheet in the cradle terminal disposed between the first light source and the second flat display panel.

15. The projector assembly according to claim 12, further comprising a reflecting sheet, wherein the first light source is formed at a bottom of the cradle terminal and the reflecting sheet reflects the light from the first light source toward the second flat display panel.

16. The projector assembly according to claim 13, wherein the second flat display panel includes a second liquid crystal panel.

17. The projector assembly according to claim 13, further comprising a second light source in the display, the second light source supplying light to the first flat display panel.

18. The projector assembly according to claim 17, wherein the projector assembly operates in a normal mode where the images are displayed on the first flat display panel, wherein the first light source emits a first light having a first brightness in the normal mode.

19. The projector assembly according to claim 18, wherein the projector assembly operates in a projection mode such that the images are projected through the projection lens, wherein the second light source emits a second light having a second brightness in the projection mode where the second brightness is greater than the first brightness in the projection mode.

20. The projector assembly according to claim 16, wherein the second liquid crystal panel comprises:
- a third substrate including a second pixel electrode; and
- a fourth substrate facing the third substrate with a second liquid crystal layer disposed between the third substrate and the fourth substrate, the fourth substrate including a second common electrode facing the second pixel electrode.

21. A projector assembly, comprising:
- a mobile terminal including a display and a body, the display having a first flat display panel and the body having an input device;
- a first light source supplying light to the first flat display panel, the first flat display panel displaying images using the light from the first light source, wherein the first light source is formed in the display;
- a projection lens projecting the images displayed in the first flat display panel;
- a first reflecting sheet in the display, the first reflecting sheet configured to reflect light emitted from the first light source toward the flat display panel;
- at least one diffusing sheet between the first light source and the first flat display panel; and
- a second reflecting sheet in the body, wherein the projection lens is formed in a sidewall of the body and the second reflecting sheet reflects the images transmitted toward the projection lens.

\* \* \* \* \*